United States Patent
Akuzawa

(10) Patent No.: US 8,860,957 B2
(45) Date of Patent: Oct. 14, 2014

(54) IMAGE FORMING APPARATUS HAVING A VIRTUAL MACHINE FOR PERFORMING PROCESSING BY ISSUING A PROCESSING REQUEST TO A GRAPHICS LIBRARY VIA AN API

(71) Applicant: Canon Kabushiki Kaisha, Tokyo (JP)

(72) Inventor: Masao Akuzawa, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/936,676

(22) Filed: Jul. 8, 2013

(65) Prior Publication Data

US 2014/0029029 A1 Jan. 30, 2014

(30) Foreign Application Priority Data

Jul. 27, 2012 (JP) ................. 2012-167648

(51) Int. Cl.
| G06K 15/02 | (2006.01) |
| H04N 1/60 | (2006.01) |
| G06K 15/00 | (2006.01) |
| H04N 1/00 | (2006.01) |
| G06T 11/00 | (2006.01) |
| G06F 3/12 | (2006.01) |

(52) U.S. Cl.
CPC ............... *G06F 3/1298* (2013.01); *H04N 1/60* (2013.01); *G06K 15/00* (2013.01); *H04N 1/00278* (2013.01); *G06T 11/00* (2013.01); *H04N 1/00* (2013.01); *G06F 3/12* (2013.01)
USPC ........................................ 358/1.11; 358/1.13

(58) Field of Classification Search
CPC ..... G06F 3/12; G06F 3/1298; H04N 1/00278; H04N 1/60; G04N 1/00
USPC ........ 358/1.1, 1.11, 1.13, 1.14, 1.18; 345/581
See application file for complete search history.

(56) References Cited

U.S. PATENT DOCUMENTS

| 5,751,289 A  * | 5/1998 | Myers ........................... 345/419 |
| 2007/0253006 A1* | 11/2007 | Mordenga ....................... 358/1.1 |
| 2010/0131944 A1* | 5/2010 | Iorio et al. ........................ 718/1 |
| 2012/0266165 A1* | 10/2012 | Cen et al. ........................... 718/1 |

FOREIGN PATENT DOCUMENTS

JP 2006-171274 6/2006

* cited by examiner

*Primary Examiner* — Gabriel Garcia
(74) *Attorney, Agent, or Firm* — Fitzpatrick, Cella, Harper & Scinto

(57) ABSTRACT

When a graphics library performs transparency calculation even if transparency processing is unnecessary, or when the graphics library does not issue an effective rendering instruction to a GPU, no satisfactory rendering performance can be obtained even in a virtual machine which runs in combination with the graphics library. To solve this, the virtual machine uses the graphics library to or not to perform transparency processing in accordance with a content to be rendered. The virtual machine uses the graphics library to issue an effective rendering instruction to the GPU.

15 Claims, 15 Drawing Sheets

FIG. 5 EXAMPLE OF CONCEPT OF VIRTUAL MACHINE RESOURCE MANAGEMENT UNIT

```
CopyAppletClass paint method g1.drawline(0, 0, 100, 100)
g1.drawline(0, 100, 100, 100)
g2.setColor(0, 0, 255)
g2.drawline(0, 200, 100, 100)
g2.setColor(0, 0, 255, 128)
g2.drawRectangle(300, 300, 100, 100)
...
g1.drawImage(offscreen, 320, 320)
...
```

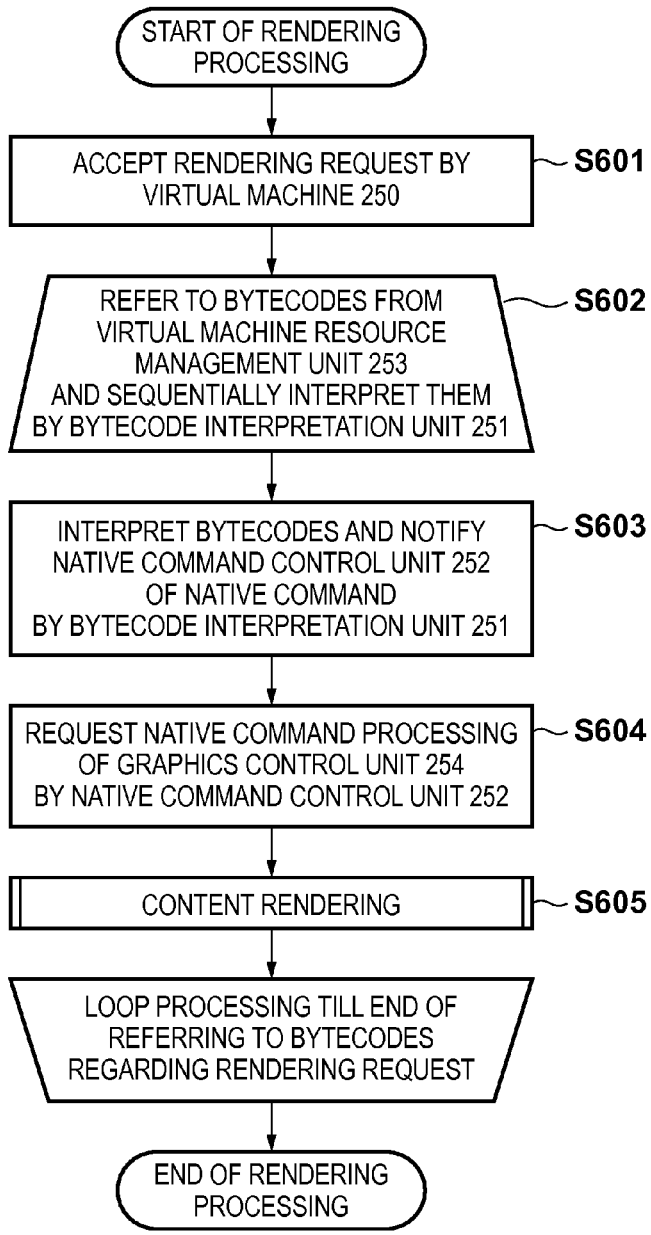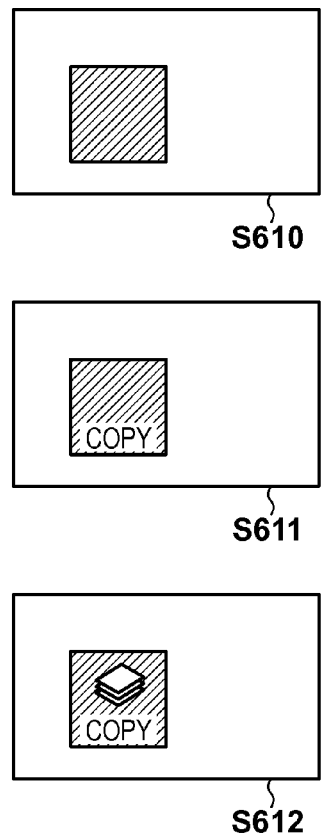

F I G. 10
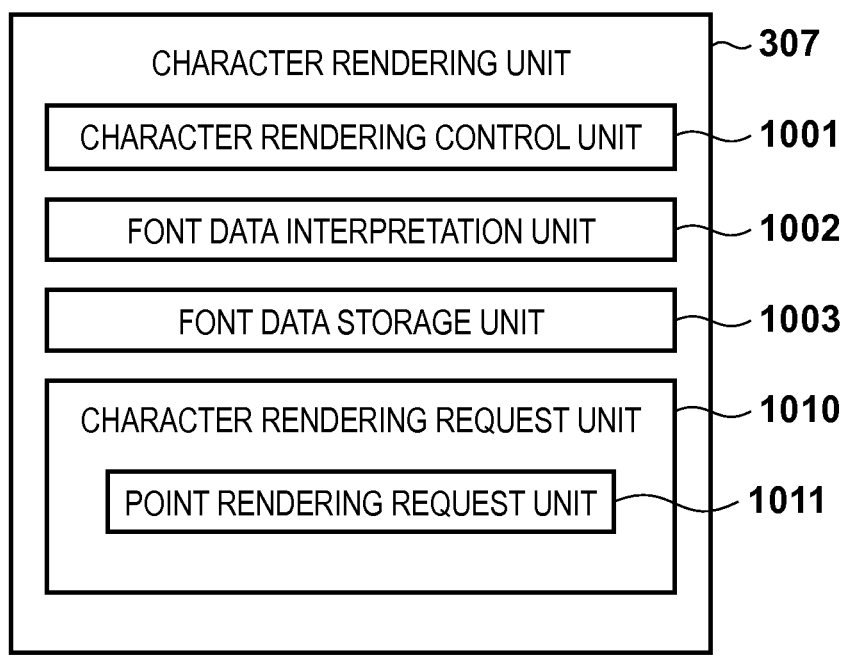

F I G. 14
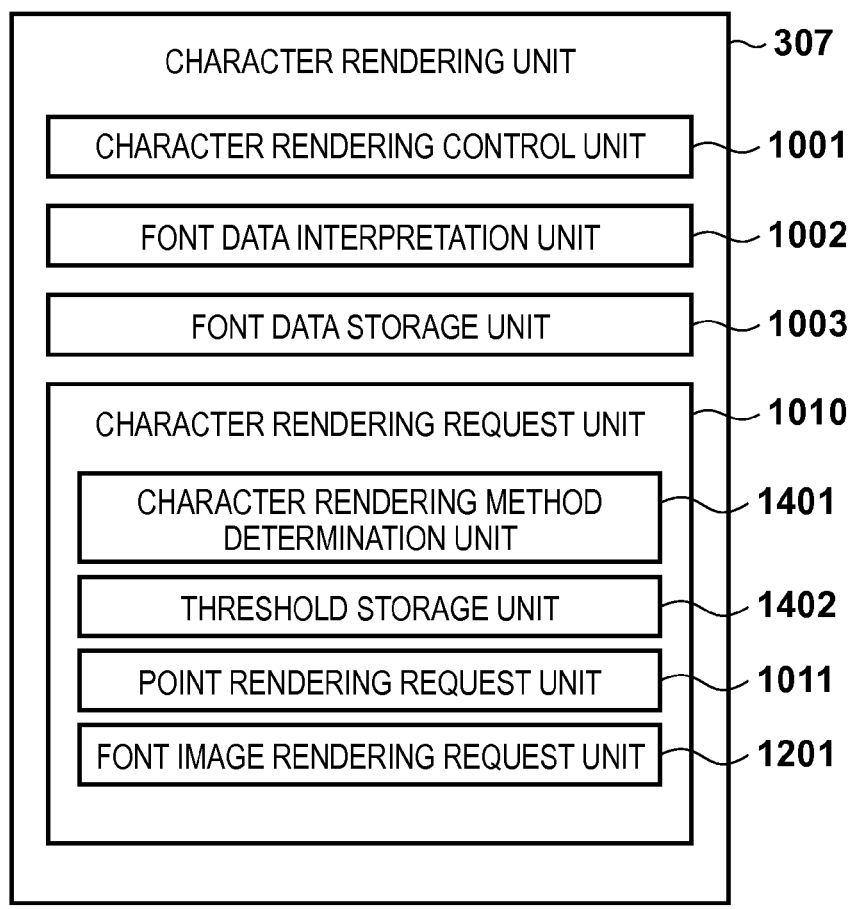

IMAGE FORMING APPARATUS HAVING A VIRTUAL MACHINE FOR PERFORMING PROCESSING BY ISSUING A PROCESSING REQUEST TO A GRAPHICS LIBRARY VIA AN API

BACKGROUND OF THE INVENTION

1. Field of the Invention

The present invention relates to an image forming apparatus which improves, for example, graphics processing of a virtual machine.

2. Description of the Related Art

Recently, embedded devices such as a smartphone, tablet terminal, and image forming apparatus have implemented user-friendly operability (to be referred to as a rich operation hereinafter). To implement the rich operation, a high frame rate is needed.

A virtual machine is being introduced into such an embedded device as an execution environment independent of hardware and software such as an operating system, in order to execute codes described in a programming language such as Java®. Some virtual machines allow installation of application software (to be referred to as an application hereinafter). This contributes to high-value added embedded devices.

However, even an application running on the virtual machine needs to implement a rich operation which is executed in accordance with, for example, a gesture made on a touch panel while its operation contents are presented with a high expression using an animation or the like. For this purpose, a GPU (Graphics Processor Unit) is used by the virtual machine to efficiently composite a rendering region (see Japanese Patent Laid-Open No. 2006-171274).

The utilization of the GPU generally improves the display processing ability to increase the frame rate of display processing and decrease the load on a CPU (Central Processing Unit).

To implement rendering processing, a graphics library, which abstracts the GPU and its driver, is normally used. A virtual machine mounted in an embedded device also generally runs in an environment where a combination of specific graphics libraries is provided. When the graphics library is used, rendering processing can be easily implemented. However, a rendering instruction may be issued without considering the GPU characteristics, or calculation not always necessary for the virtual machine may be performed in the graphics library. In such a case, the performance of the GPU cannot be maximized owing to an increase in communication between the CPU and the GPU, and an increase in CPU load arising from an increase in calculation amount.

SUMMARY OF THE INVENTION

The present invention has been made in consideration of the conventional situation, and provides an image forming apparatus capable of reducing the overhead when a graphics library uses a GPU, and implementing efficient image processing without impairing the advantages of the GPU even in an arrangement in which rendering processing is performed from a virtual machine using a graphics library.

According to one aspect of the invention, the present invention, there is provided an image forming apparatus including a display unit, comprising: a graphics driver configured to use a graphics processor which renders an image to be displayed by the display unit; a graphics library configured to issue a rendering request to the graphics driver in accordance with a processing request via an API; and a virtual machine unit configured to execute a program described in a predetermined programming language, the virtual machine unit performing processing by issuing a processing request to the graphics library via the API in accordance with the program to be executed, wherein when performing rendering by executing the program, the virtual machine unit determines whether a color of image data in a frame buffer includes a transparency value, when the color includes a transparency value, selects a transparency processing-compatible graphics library as the graphics library and issues a rendering processing request to the graphics library, and when the color does not include a transparency value, selects a transparency processing-incompatible graphics library as the graphics library and issues a rendering processing request to the graphics library.

According to another aspect of the present invention, there is provided an image forming apparatus including a display unit, comprising: a graphics driver configured to use a graphics processor which renders an image to be displayed by the display unit; a graphics library configured to issue a rendering request to the graphics driver in accordance with a processing request via an API; and a virtual machine unit configured to execute a program described in a predetermined programming language, the virtual machine unit performing processing by issuing a processing request to the graphics library via the API in accordance with the program to be executed, wherein when rendering a straight line parallel to or perpendicular to a raster line by executing the program, the virtual machine unit issues a rendering processing request to the graphics library to fill a rectangular region having a width of the straight line as a length of a short side and a length of the straight line as a length of a long side.

According to still another aspect of the present invention, there is provided an image forming apparatus including a display unit, comprising: a graphics driver configured to use a graphics processor which renders an image to be displayed by the display unit; a graphics library configured to issue a rendering request to the graphics driver in accordance with a processing request via an API; and a virtual machine unit configured to execute a program described in a predetermined programming language, the virtual machine unit performing processing by issuing a processing request to the graphics library via the API in accordance with the program to be executed, wherein when rendering a character by executing the program, the virtual machine unit generates a character image corresponding to the character, and issues a processing request to the graphics library to render, for each pixel, pixels forming the character in the character image.

According to the present invention, the virtual machine changes the graphics library use method based on the transparency value of a content to be rendered. Also, the virtual machine uses the graphics library to issue a highly effective instruction to the GPU. Therefore, unnecessary calculation processing can be skipped and the GPU can be effectively used, improving the rendering performance.

Further features of the present invention will become apparent from the following description of exemplary embodiments with reference to the attached drawings.

BRIEF DESCRIPTION OF THE DRAWINGS

FIG. 5 is a conceptual view showing a resource managed by the virtual machine to which the embodiment is applied;

FIGS. 6A and 6B are flowcharts showing overall rendering processing by the virtual machine to which the embodiment is applied, and a conceptual view showing the course of rendering processing, respectively;

FIG. 10 is a software block diagram showing the character rendering function of the virtual machine to which the embodiment is applied;

FIG. 14 is a software block diagram showing the character rendering function of a virtual machine to which an embodiment is applied;

DESCRIPTION OF THE EMBODIMENTS

Preferred embodiments of the present invention will now be described with reference to the accompanying drawings.

First Embodiment

<Hardware Arrangement>

Figure 1:
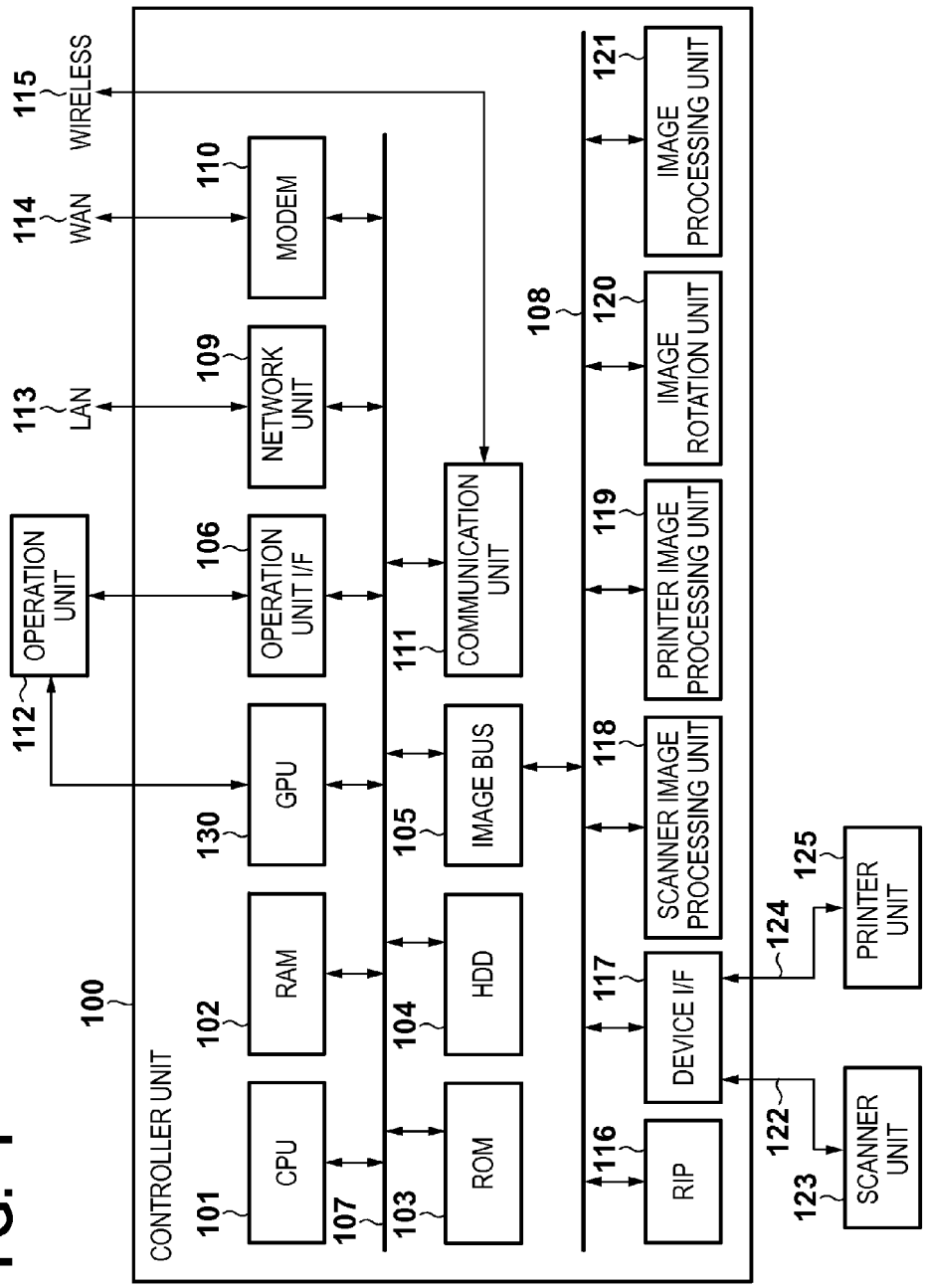
FIG. 1 is a hardware block diagram showing an image forming apparatus to which an embodiment is applied.

FIG. 1 is a hardware block diagram exemplifying the internal arrangement of an image forming apparatus according to the first embodiment. The image forming apparatus shown in FIG. 1 includes, as basic components, a controller unit 100 which controls respective units in the image forming apparatus, an operation unit 112, a scanner unit 123, and a printer unit 125. The operation unit 112 is formed from hard keys such as a ten-key pad for inputting a numeral and a start key for executing processing, and a liquid crystal touch panel. The operation unit 112 provides a user interface which allows the user to operate the image forming apparatus. The user can input settings and information to the image forming apparatus by touching (pressing) icons and buttons (or hard keys) which are displayed on the touch panel of the operation unit 112 and represent setting items.

The scanner unit 123 reads an image such as an original as image data. The printer unit 125 conveys printing paper and prints image data as a visible image on it.

The controller unit 100 is connected to the scanner unit 123 via a bus 122, and the printer unit 125 via a bus 124. The controller unit 100 is connected to other devices via a LAN 113, public line (WAN) 114, and wireless 115, and controls input/output of image information and device information.

A CPU 101 is a controller which executes a program and controls the overall system. A ROM 102 is a system work memory used by the CPU 101 to run, and is also an image memory for temporarily storing image data. A ROM 103 is a boot ROM. The ROM 103 stores the boot program of the system. An HDD (Hard Disk Drive) 104 stores system software, image data, and information (wireless communication specifications) about all wireless communications supported by a communication unit 111 to be described later.

The image forming apparatus can increase functions by installing an application having functions to be used. By installing the application, an application program for operating various functions on the image forming apparatus is stored in the ROM 102 or HDD 104.

An operation unit I/F 106 is an interface unit with the operation unit 112 serving as a user interface (UI), and outputs, to the operation unit 112, data to be displayed on the operation unit 112. Also, the operation unit I/F 106 transfers, to the CPU 101, information input by the user via the operation unit 112.

A GPU 130 is a graphics processor which outputs the contents of the image memory ensured in the ROM 102 to the display unit of the operation unit 112 by DMA or the like. By outputting the image data, the image displayed on the operation unit 112 is updated. Image data may be output every time it is rewritten, or may be output periodically. The GPU 130 has a function of compositing image data of different image buffers in the image memory. Some GPUs have an alpha blending function of performing composition reflecting the opacity (or transparency), that is, cope with transparency processing. Even the GPU having the alpha blending function may not have a transparency value (alpha channel) depending on image data to be composited, and thus has even a function of compositing image data without using the function of transparency processing. Further, the GPU 130 has a function of filling a rectangular region and a function of transferring a block of bits. Some GPUs further have a 3D rendering function including shading processing, but the GPU in the embodiment need not have the 3D rendering function. The GPU in the embodiment has high performance for filling of a rectangle having sides parallel to a raster line. This also applies to general GPUs.

A Network unit 109 is connected to the LAN 113 and inputs/outputs information. A MODEM 110 is connected to the public line (WAN) 114 and inputs/outputs information.

The communication unit 111 is connected to the wireless (WIRELESS) 115 via an antenna (not shown), and inputs/outputs information. The communication unit 111 can perform a plurality of types of wireless communications. These devices are arranged on a system bus 107.

An image bus 105 is a bus bridge which connects the system bus 107 and an image bus 108 for transferring image data at high speed, and converts a data structure. The image bus 108 is a PCI bus or a bus defined by IEEE1394 or the like.

Among devices arranged on the image bus 108, a raster image processor (RIP) 116 rasterizes a PDL code into a bitmap image. A device I/F unit 117 connects the scanner unit 123 or printer unit 125 to the controller unit 100 and performs synchronous/asynchronous conversion of image data.

A scanner image processing unit 118 corrects, processes, or edits input image data. A printer image processing unit 119 performs correction, resolution conversion, and the like complying with the printer unit 125 for printout image data. An image rotation unit 120 rotates image data. An image processing unit 121 performs compression/decompression processing based on JPEG, JBIG, MMR, MH, and the like for image data, and format conversion processing based on PDF, TIFF, OCR, encryption, and the like.

<Software Arrangement>

Figure 2:
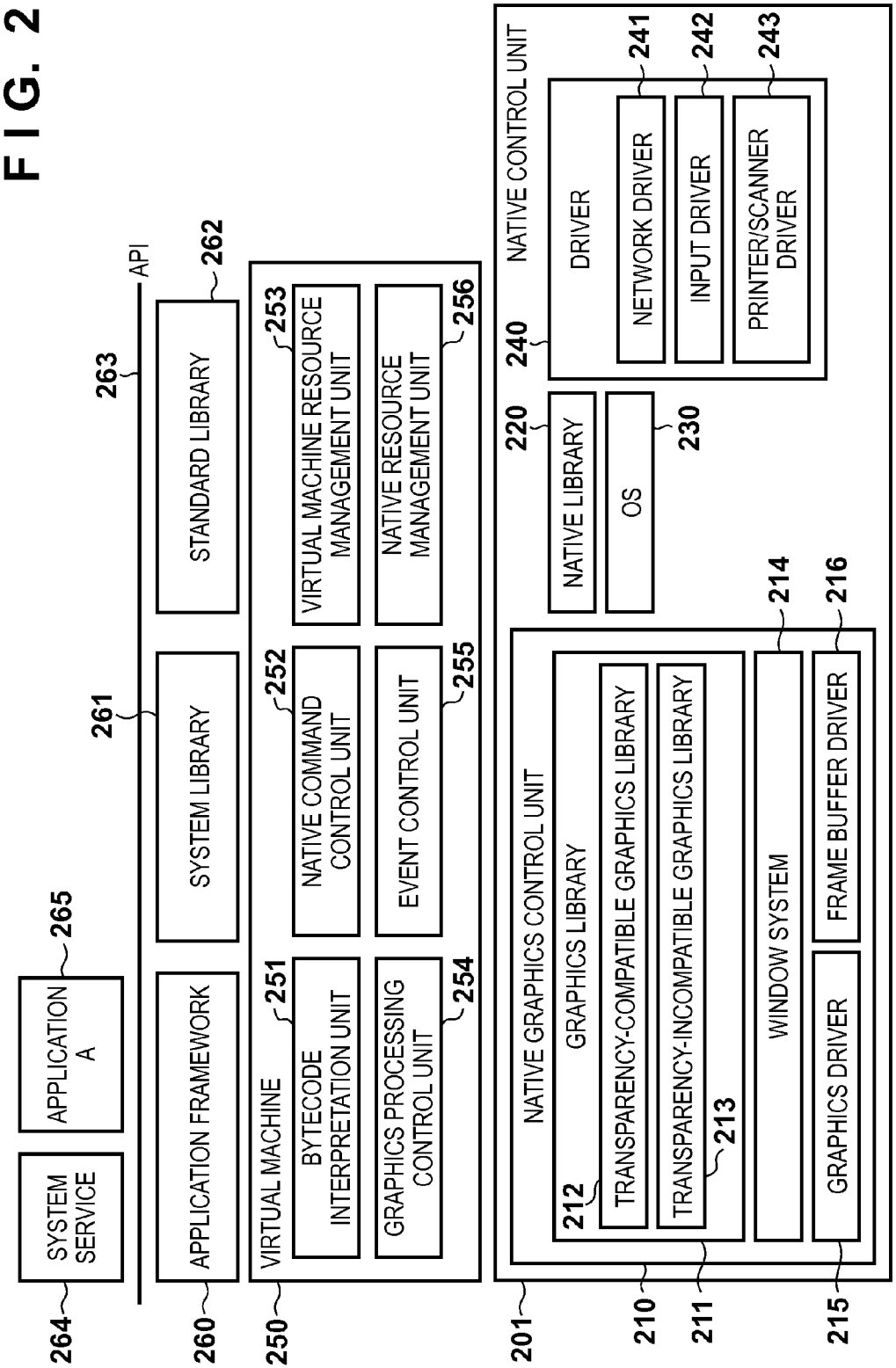
FIG. 2 is a software block diagram showing the image forming apparatus to which the embodiment is applied.

FIG. 2 is a block diagram exemplifying the software arrangement of the image forming apparatus. Although the software arrangement in FIG. 2 seems to be expressed by a hierarchical structure for convenience, upper and lower layers are not always definite and may take a parallel relationship depending on the function. That is, the form of the software structure in the embodiment is not limited to this. The software of the image forming apparatus is stored in the HDD 104.

(Application and Library)

A system service 264 is an application which is registered in advance in the image forming apparatus, and may provide a function to another application or function singly. Examples of the system service which provides a function to another application are an error recovery service which performs processing as a substitute upon generation of an error, and an applet viewer service (AVS) which controls the operation unit 112. An example of the system service which functions singly is a service management service (SMS) which is accessed from a PC using a browser and receives a predetermined application file. An application A 265 is an application installed by the SMS, and provides various functions on the image forming apparatus. The application A 265 can be referred to at the time of executing the AVS, and communicates with the user via the operation unit 112. The application A 265 can use, via an API 263, the functions of a system library 261 and standard library 262 provided by the image forming apparatus. The system library 261 includes a function of controlling jobs such as print processing, copy processing, and scan processing. The application A 265 can receive data from a PC or the like via the Network unit 109 of the image forming apparatus by using the system library 261, and print by using the printer unit 125. The standard library 262 is a library for providing general-purpose functions not limited to those on the image forming apparatus, such as calculation processing, character string processing, communication processing, screen control processing, and encryption processing. An application framework 260 provides a function of managing the lifecycle of an application.

(Virtual Machine)

A virtual machine 250 is a program (virtual machine program) which provides the execution environment of an application described in a predetermined programming language typified by Jave®. The virtual machine (or virtual machine unit) 250 includes a bytecode interpretation unit 251 which interprets a bytecode obtained by compiling the source code of an application or the like for the virtual machine, a native command control unit 252 which controls an interpreted native command, a virtual machine resource management unit 253 which manages a resource (for example, the bytecode of an application or a generated instance) for an application running on the virtual machine 250, a graphics processing control unit 254 which processes a rendering instruction from an application to the operation unit 112, an event control unit 255 which performs control to notify an application of status changes of the controller unit 100, operation unit 112, scanner unit 123, and printer unit 125, and a native resource management unit 256 which manages a resource required when the virtual machine 250 requests processing of a native control unit 201. The bytecode interpretation unit 251 converts an interpreted bytecode into a native command, and requests processing of the native command control unit 252. Based on the contents of the native command, the native command control unit 252 requests processing of the native control unit 201, graphics processing control unit 254, event control unit 255, virtual machine resource management unit 253, and native resource management unit 256. For example, when the native command control unit 252 receives a new object generation request from an application, it requests the virtual machine resource management unit 253 to generate an object and manage the lifecycle of the object. Note that the object is formed from an area called a field for storing a variable or constant, and a method area for storing a processing instruction, which are also managed by the virtual machine resource management unit 253. Upon receiving a screen rendering instruction from an application, the native command control unit 252 requests the graphics processing control unit 254 to render a screen. The graphics processing control unit 254 prepares and controls rendering by using a native library 220, and requests rendering of a native graphics control unit 210. The graphics processing control unit 254 issues a rendering request and performs requested processing. For example, when the native command control unit 252 interprets a request from an application to detect an input operation to the operation unit 112, it requests the event control unit 255 to register an operation event. The event control unit 255 detects an input event from a window system 214 and notifies all registered applications of the input event. The event control unit 255 can control even an event generated when the controller unit 100 changes to the power saving state, and an event generated when paper is set on the scanner unit 123. The event control unit 255 is not limited to control of events regarding the operation unit 112. The native command control unit 252 requests the native resource management unit 256 to manage a resource necessary for the virtual machine 250 itself. The native resource management unit 256 requests the native library 220 to ensure an area necessary for the virtual machine 250 to operate, and ensure a thread. In addition, the native resource management unit 256 manages an area which is ensured from a native graphics library 211 by the graphics processing control unit 254 and is internally used.

(Native Control Unit)

The native control unit 201 processes a request from the virtual machine 250, and performs processing of notifying the virtual machine 250 of an event. The native control unit 201 includes the native graphics control unit 210, the native library 220, an OS (Operating System) 230, and a driver 240. The native graphics control unit 210 includes the graphics library 211, the window system 214, a graphics driver 215, and a frame buffer driver 216. The native graphics control unit 210 mainly provides a function of writing screen information in an area ensured in the ROM 102, and outputting the information to the operation unit 112. Either or both of the CPU 101 and GPU 130 execute these functions.

The graphics library 211 provides an API (Application Program Interface) regarding screen rendering. When the graphics library 211 accepts a call for a command (or function) from the graphics processing control unit 254 of the virtual machine 250 via the API, it performs image processing in accordance with the called command and requests the window system 214 to render the result. Note that the graphics library 211 may be formed from a plurality of libraries. For example, a library specialized in low-level rendering processing for a straight line or quadrangle, and a library coping with high-level rendering processing such as transparency processing or vector rendering can coexist in the same environment. The embodiment adopts a high-level transparency-compatible graphics library 212 coping with transparency processing, and a high-speed transparency-incompatible graphics library 213 not coping with transparency processing. Image composition which reflects the color and transparency (or opacity) of an image object when compositing a given image object with another image object and rendering it is transparency processing-compatible rendering processing. Rendering processing which supports only overwrite composition without reflecting the transparency is transparency processing-incompatible rendering processing. Upon receiving the rendering request based on the function in the graphics library, the window system 214 issues a rendering processing request to an appropriate screen output driver based on setting information of the window system 214. The "appropriate screen output driver" is determined in advance in accordance with the setting information of the window system 214. The driver can be switched by changing the setting information. Basically, functions provided by the frame buffer driver 216 include or are equivalent to those provided by the graphics driver 215. If these functions are not equivalent, the frame buffer driver 216 is used for functions which cannot be provided by the graphics driver 215. For example, if functions provided by the frame buffer driver 216 are equivalent to those provided by the graphics driver 215, the window system 214 requests rendering processing of only the graphics driver 215 as long as the GPU copes with transparency processing, including the graphics driver. If the GPU does not cope with transparency processing, the frame buffer driver 216 is used for rendering in the frame buffer, and the graphics driver 215 is used for another function, for example, processing of writing image data of the frame buffer in the image buffer of the operation unit 112.

The window system 214 has not only a function regarding screen rendering, but also a function of controlling the screen for each window, and a function of controlling a signal from an input driver 242 which has received an input from the operation unit 112. The graphics driver 215 has a function of issuing a rendering instruction to the GPU 130 upon receiving a rendering request from the window system 214. The GPU 130 outputs rendering contents (image data) to the display unit (display buffer) of the operation unit 112 in accordance with the rendering instruction. Based on the rendering instruction from the window system 214, the frame buffer driver 216 outputs rendering contents to a memory area (also called a frame buffer) managed in the ROM 102 linked to the display unit of the operation unit 112 called a frame buffer device. The window system 214 outputs, to the display unit of the operation unit 112, image data subjected to the rendering request, and can also write it as a screen not to be output (to be referred to as an offscreen hereinafter) in the ROM 102. The graphics library 211 can use the offscreen rendering function of the window system 214. Note that the screen (onscreen) output (that is, displayed) to the operation unit 112 is assigned as some or all of windows controlled by the window system 214.

As the OS 230, a real-time OS is generally used, but a general-purpose OS such as Linux® is sometimes used. The native library 220 provides functions such as a system call for calling the function of the OS 230, file system control, thread control, process control, and memory control. The driver 240 is a program for controlling a device. Some drivers are loaded to the ROM 102 upon activation of the OS 230, and some are loaded, as needed. For example, a network driver 241 provides a function of controlling the communication unit 111. The input driver 242 provides a function of controlling the operation unit I/F 106. A printer/scanner driver provides a function of controlling the scanner unit 123 and printer unit 125. Note that the graphics driver 215 and frame buffer driver 216 regarding screen rendering are not included in the driver 240 for descriptive convenience, but can be interpreted to be included in the driver 240. Further, the driver 240 can include a driver for controlling a resource other than the above-described ones.

<Graphics Processing Control Unit>

Figure 3:
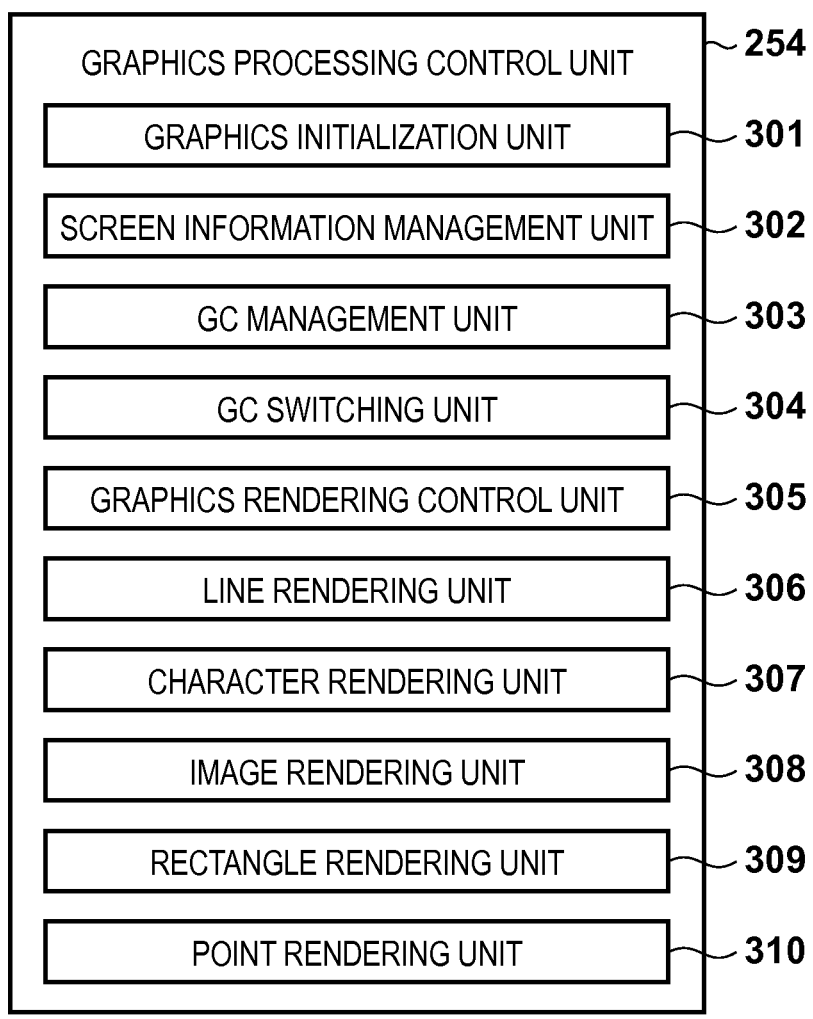
FIG. 3 is a software block diagram showing the rendering function of a virtual machine to which the embodiment is applied.

FIG. 3 is a software block diagram exemplifying details of the graphics processing control unit 254 in the virtual machine 250. A graphics initialization unit 301 requests the native resource management unit 256 to manage a target screen region at the time of activating the virtual machine 250 or generating an offscreen. Note that the screen is a region which can be rendered by the virtual machine 250. The graphics initialization unit 301 generates a graphics context (to be also referred to as GC hereinafter). The graphics context is information linked to a screen, and is a resource which stores information (rendering attribute) about rendering, such as the rendering color and rendering range. For example, in Java®, the graphics context is an already-defined class and defines a method of changing a specific item value, in addition to the information. Note that a plurality of graphics contexts can be acquired for one screen. For example, in the present invention, two graphics contexts, that is, a graphics context which includes transparency processing and a graphics context which does not include it are generated for each screen. A GC switching unit 304 switches a graphics context to be used. A screen information management unit 302 manages a screen generated by the graphics initialization unit 301, and information (for example, color and rendering range) accompanying the screen. A GC management unit 303 manages a graphics context generated by the graphics initialization unit 301. A graphics rendering control unit 305 makes preparations for rendering a content, and requests rendering of a line rendering unit 306, a character rendering unit 307, an image rendering unit 308, a rectangle rendering unit 309, a point rendering unit 310, and the native graphics control unit 210. Note that the content is a general term of a rendering object, including a line, rectangle, character, and image to be rendered on the screen. The line rendering unit 306 has a function of rendering a line on the screen. The character rendering unit 307 has a function of rendering a character on the screen. The image rendering unit 308 has a function of rendering an image on the screen. The rectangle rendering unit 309 has a function of rendering a rectangle on the screen. The point rendering unit 310 has a function of rendering a point on the screen. Note that a circle and polygon can be rendered by a combination of the line rendering unit 306 and point rendering unit 310. Hence, contents which can be rendered by the virtual machine 250 are not limited to a line, character, and the like mentioned in the embodiment.

<Initialization Processing by Graphics Initialization Unit>

Figure 4:
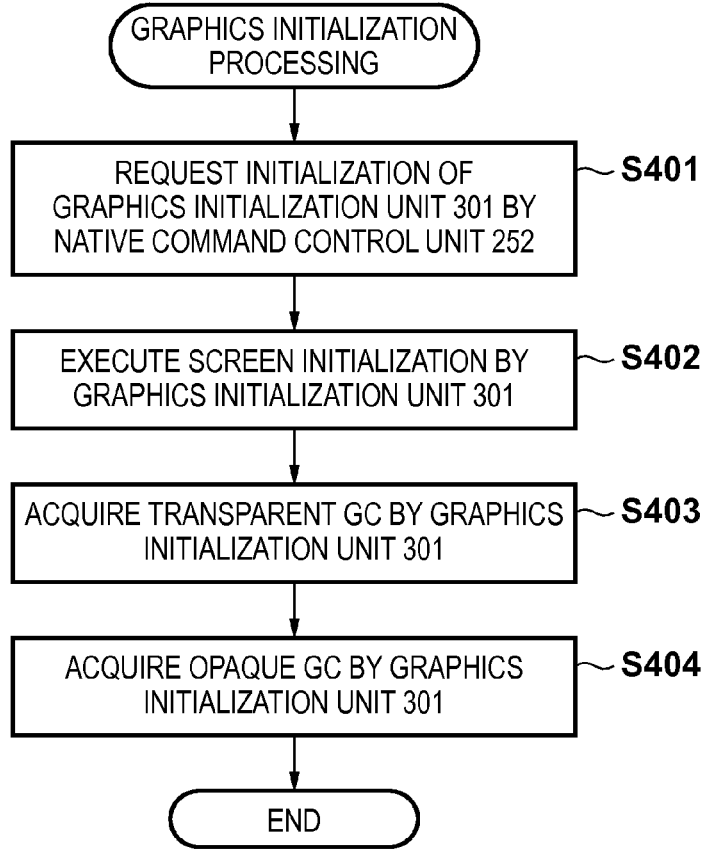
FIG. 4 is a flowchart showing initialization of the rendering function of the virtual machine to which the embodiment is applied.

FIG. 4 is a flowchart showing initialization processing to be performed by the graphics initialization unit 301. This flowchart shows processing when the virtual machine 250 is activated or the virtual machine 250 detects an offscreen generation processing request. In step S401, the native command control unit 252 notifies the graphics initialization unit 301 of a native command regarding screen initialization that is interpreted by the bytecode interpretation unit 251. In step S402, the graphics initialization unit 301 requests the graphics library 211 to generate a screen of a size complying with the notification contents. Then, the graphics initialization unit 301 requests the graphics library 211 to store the generated screen in the native resource management unit 256. In step S403, the graphics initialization unit 301 requests the graphics library 211 to generate a transparent graphics context (transparent GC) including transparency processing associated with the generated screen. The graphics initialization unit 301 requests the graphics library 211 to store the generated transparent GC in the GC management unit 303. In step S404, an opaque GC not including transparency processing associated with the generated screen is generated and stored in the same manner as in step S403. In the embodiment, the transparency-compatible graphics library 212 performs rendering processing based on the transparent GC, and the transparency-incompatible graphics library 213 performs rendering processing based on the opaque GC. For the screen generated in step S402, not only the size but also the color are designated. The color designation includes transparency designation. The generated screen therefore has the designated size and designated color. As described above, the screen and graphics context are pre-defined classes in, for example, Jave®. Generation of a screen and graphics context can be implemented by generation of their instances.

<Example of Object>

FIG. 5 exemplifies the concept of object information regarding rendering processing managed by the virtual machine resource management unit 253. FIG. 5 shows the contents of a paint method for a CopyAppletClass object. g1 and g2 shown in FIG. 5 correspond to screens. g1.drawline(0, 0, 100, 100) processing is processing of drawing a line between two points (0, 0) and (100, 100) on the screen g1. Similarly, g2.drawRectangle is processing of rendering a rectangle on the screen g2, and g2.drawImage is processing of rendering an image or offscreen on the screen g2. g2.setColor (0, 0, 255) processing designates the color of a content to be rendered on the screen g2 by subsequent processing. This method is a method of changing a rendering color set as a graphics context. In this way, the virtual machine resource management unit 253 manages an object which defines in advance procedures (method) to render a content. When the paint method is executed, instructions shown in FIG. 5 are sequentially executed to render lines and rectangles on the screens g1 and g2, and the screen g2 is rendered as an offscreen. Note that the concept in FIG. 5 is merely for description, and the management form of an object by the virtual machine resource management unit 253 is not limited to this conceptual view.

<Content Rendering Processing>

FIG. 6A is a flowchart showing content rendering processing. In step S601, the virtual machine 250 accepts a rendering request from an application. Note that the timing to generate a rendering request is, for example, the timing of application activation, the timing of screen transition based on detection of an input to the operation unit 112, and the timing when the window of the virtual machine 250 managed by the window system 214 changes to the top surface from a non-top surface. In step S602, the bytecode interpretation unit 251 sequentially interprets bytecodes till the completion of referring to bytecodes from the virtual machine resource management unit 253, and repeats processes in steps S603 to S605. In step S603, the bytecode interpretation unit 251 notifies the native command control unit 252 of the interpreted bytecodes as native commands. In step S604, the native command control unit 252 requests the graphics processing control unit 254 to process a native command regarding rendering. In step S605, the graphics processing control unit 254 renders the content (details will be described later).

FIG. 6B shows the course of actually rendering a content. FIG. 6B exemplifies a course of outputting, to the screen, a button to execute copying for the image forming apparatus. To display the button, for example, one class is defined, and a method for displaying the button is defined in the class. The method includes, for example, a drawRectangle instruction to render a button frame, a drawString instruction to render a character in the button, and a drawImage instruction. The arguments of the respective instructions include the positions of the diagonal points of a rectangle, and a character string. Attributes defined in the graphics context are applied as attributes necessary for rendering, such as the color, line width, and opacity. By executing the method, in step S610, the bytecode interpretation unit 251 interprets the drawRectangle instruction stored in the virtual machine resource management unit 253, and issues a rendering request as a native command to the graphics processing control unit 254, thereby rendering a rectangle on the screen. In step S611, the bytecode interpretation unit 251 interprets the drawString instruction stored in the virtual machine resource management unit 253, and issues a rendering request as a native command to the graphics processing control unit 254, thereby rendering characters "copy" on the screen. In step S612, the bytecode interpretation unit 251 interprets the drawImage instruction stored in the virtual machine resource management unit 253, and issues a rendering request as a native command to the graphics processing control unit 254, thereby rendering an image on the screen. By executing these steps, the copy button is rendered on the screen. Various user interfaces can be implemented on the screen by repetitively performing this processing.

(Content Rendering Processing (S605))

Figure 7:
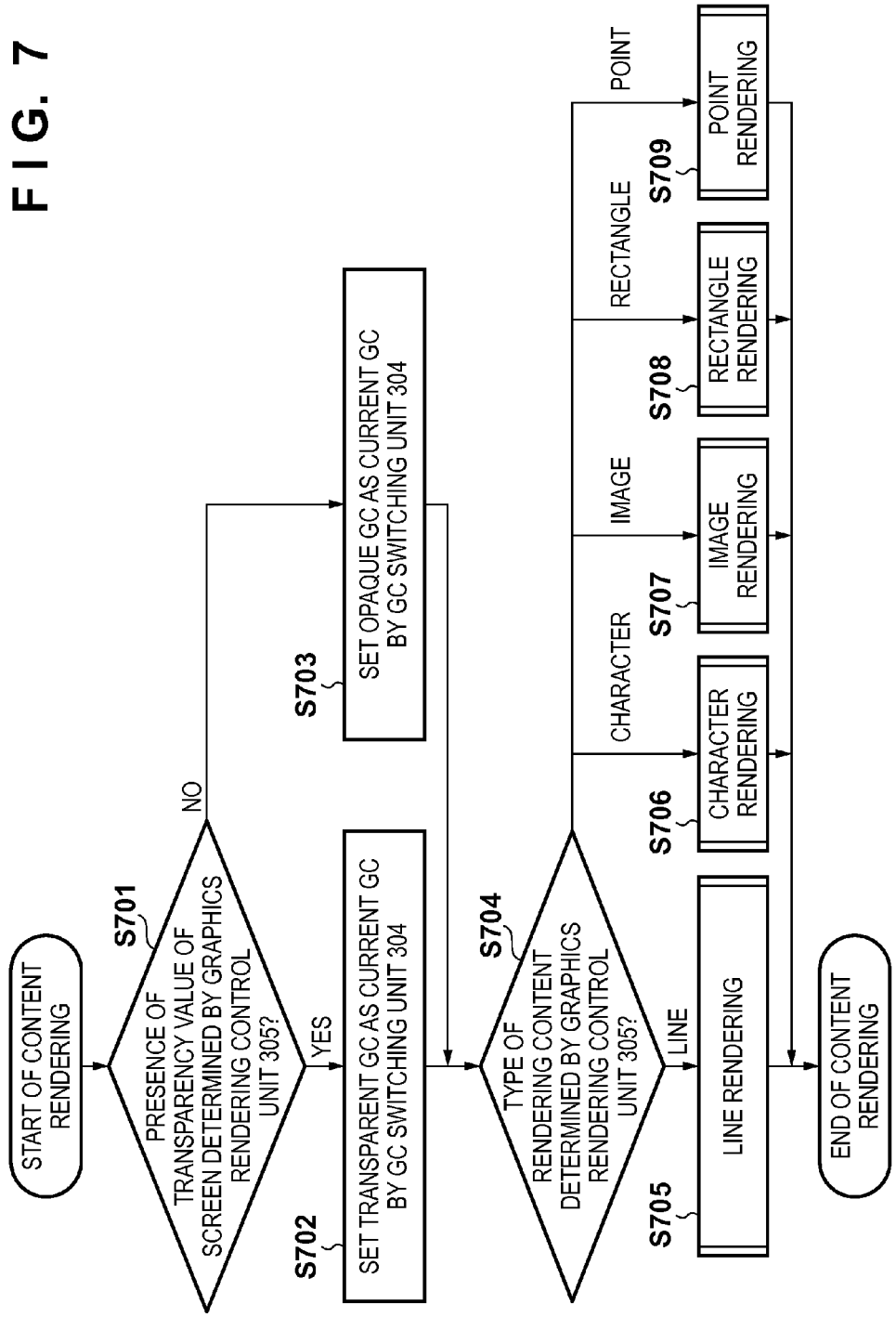
FIG. 7 is a flowchart showing content rendering processing by the virtual machine to which the embodiment is applied.

FIG. 7 is a flowchart showing details of the content rendering processing in step S605. In step S701, the graphics rendering control unit 305 acquires, from the screen information management unit 302, color information set for the screen on which a content is to be rendered. The color information set for the screen on which a content is to be rendered is, for example, color information of the background color of the screen. The graphics rendering control unit 305 determines the presence/absence of a transparency value from the acquired color information. The color information includes, for example, R, G, and B color components, and if the color is the target of transparency processing, further includes a transparency value (or alpha channel). If the color set for the screen does not include a transparency value, it can be determined that transparency processing for the content to be rendered on the screen is unnecessary. To the contrary, if the color includes a transparency value and the transparency value is larger than 0 (or the opacity is smaller than 1), transparency processing is necessary. Thus, if there is a transparency value larger than 0, the process shifts to step S702; if there is no transparency value, to step S703. In step S702, the GC switching unit 304 requests the GC management unit 303 to acquire a transparent GC. The acquired transparent GC is set as the current graphics context, and color information of the screen is set in the graphics context. Since the graphics context is referred to in rendering using it, it is rendered in a color having a transparency in subsequent rendering by setting the transparent GC. If the acquired color includes a transparency value but the value is 0 (that is, no transparency) in step S701, it may be determined that transparency processing is unnecessary, and the process may branch to step S703. In step S703, the GC switching unit 304 requests the GC management unit 303 to acquire an opaque GC. The acquired opaque GC is set as the current graphics context, and color information of the screen is set in the graphics context. In step S704, the graphics rendering control unit 305 determines the type of content to be rendered. The process shifts to step S705 if the content is a line, step S706 if it is a character, step S707 if it is an image, step S708 if it is a rectangle, and step S709 if it is a point. Rendering of a line in step S705 and rendering of a character in step S706 will be described in detail later. In step S707, the image rendering unit 308 acquires, via the bytecode interpretation unit 251, an image object stored in the virtual machine resource management unit 253. The image rendering unit 308 acquires an image size from the acquired image object, and requests the graphics library 211 to ensure a buffer for rendering an image. The image rendering unit 308 temporarily stores the acquired image buffer in the native resource management unit 256. After that, the image rendering unit 308 stores pixel data of the image object in the image buffer, and requests the graphics library 211 to render the image buffer based on the current graphics context. In step S708, the rectangle rendering unit 309 requests the graphics library 211 to render a rectangle based on the current graphics context. In step S709, the point rendering unit requests the graphics library 211 to render a point based on the current graphics context.

In the above-described way, the virtual machine 250 according to the embodiment loads, to the virtual machine resource management unit 253, bytecodes obtained by compiling an application, and the bytecode interpretation unit 251 sequentially interprets them. Based on an interpreted native command, the native command control unit 252 requests processing of the graphics processing control unit 254, and the graphics processing control unit 254 sends a rendering request to the graphics library 211, implementing rendering processing on the operation unit 112. In the course of the rendering processing, the graphics context is switched in accordance with the presence/absence of the transparency value of the screen color, and the graphics library 211 is requested to render a content in accordance with the presence/absence of transparency processing. A content having no transparency value is rendered using the transparency-incompatible graphics library 213. When there is no transparency value, rendering processing for transparency is not performed, so the rendering time can be shortened, compared to a case in which rendering is performed using the transparency-compatible graphics library 212. This effect becomes significant when the GPU 130 or graphics driver 215 does not cope with transparency processing because the transparency-compatible graphics library 212 needs to perform rendering by using the frame buffer driver 216, that is, the CPU 101. Therefore, unnecessary transparency processing is appropriately skipped using the transparence-incompatible graphics library 213, as in the virtual machine 250. This can reduce the load on the CPU 101 and improve the performance of the image forming apparatus.

(Line Rendering Processing (S705))

Figure 8:
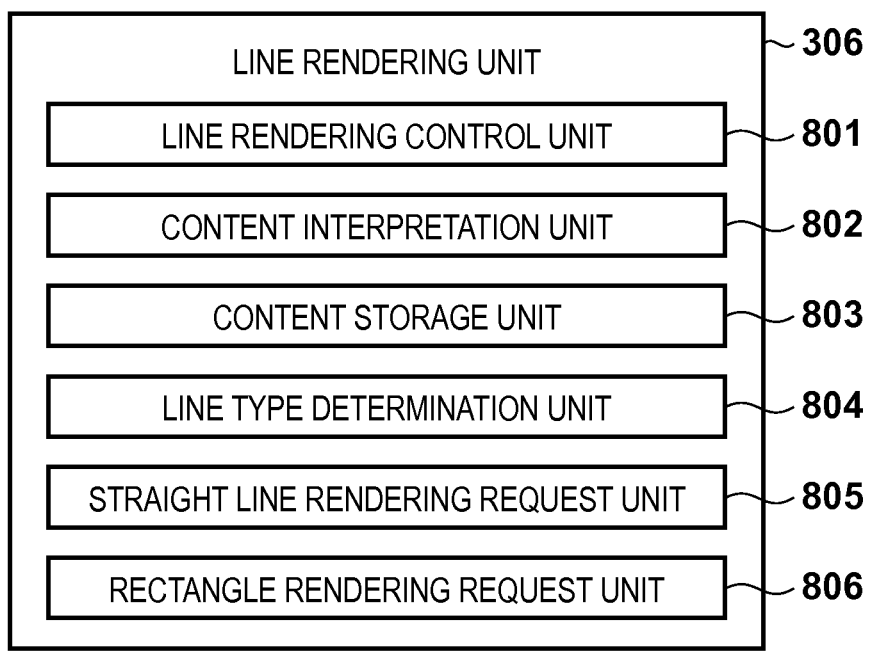
FIG. 8 is a software block diagram showing the line rendering function of the virtual machine to which the embodiment is applied.

FIG. 8 is a software block diagram showing details of the line rendering unit 306. A line rendering control unit 801 accepts a content rendering request from the graphics rendering control unit 305, and requests a straight line rendering request unit 805 or rectangle rendering request unit 806 to render the content based on the result of a line type determination unit 804. A content storage unit 803 stores a content in response to a request from the line rendering control unit 801. The line type determination unit 804 determines whether the content is a vertical or horizontal line. The straight line rendering request unit 805 requests the graphics library 211 to render a straight line. The rectangle rendering request unit 806 requests the graphics library 211 to render a vertical line/horizontal line by using a rectangle with a width of 1.

Figure 9:
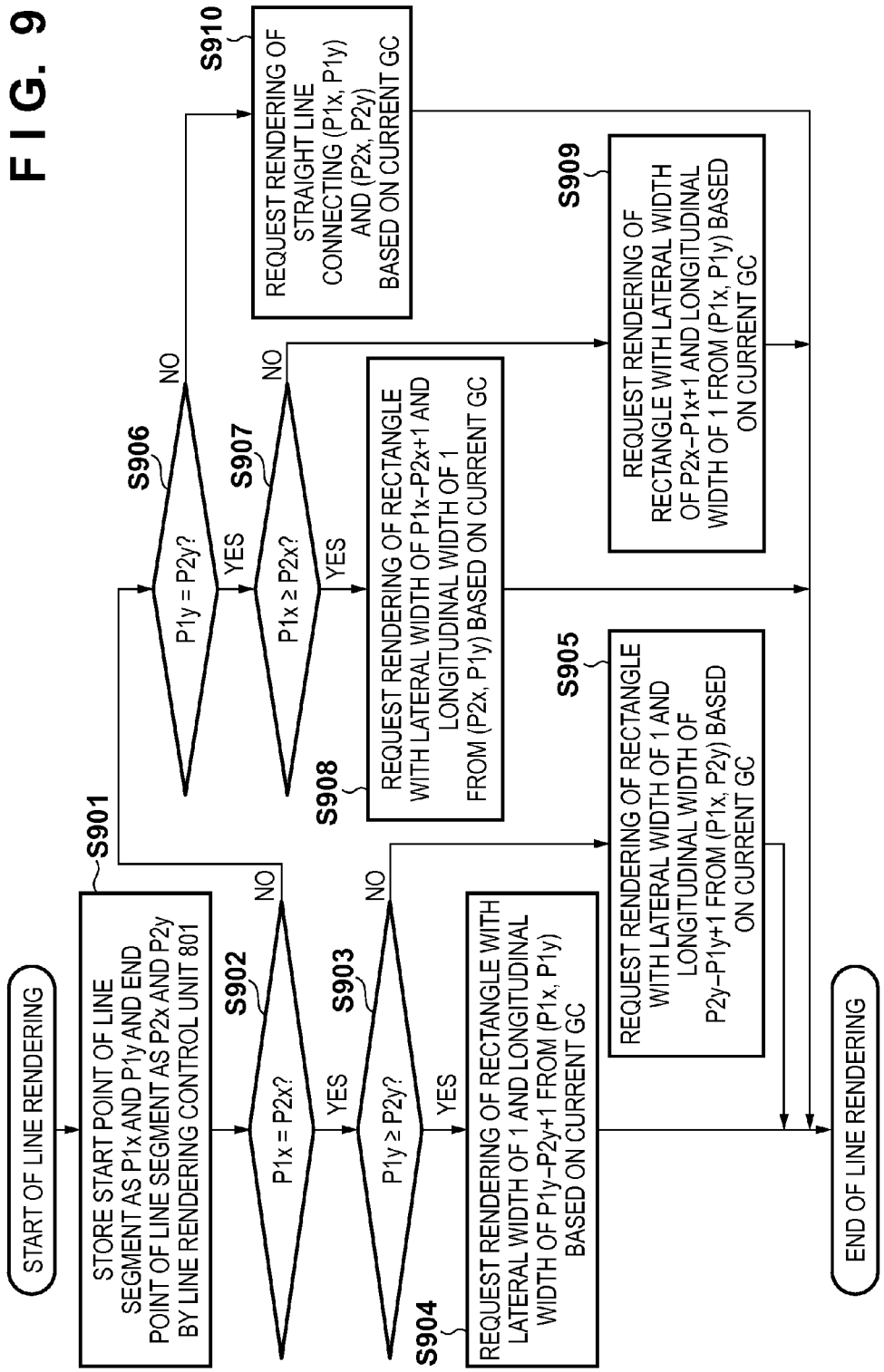
FIG. 9 is a flowchart showing line rendering processing by the virtual machine to which the embodiment is applied.

FIG. 9 is a flowchart showing details of the line rendering processing in step S705. In step S901, the line rendering control unit 801 stores, as P1x, P1y, P2x, and P2y in the content storage unit 803, information of two points P1 and P2 forming a straight line included in a content. Px represents the x-coordinate of the point P on the x-axis which is a horizontal axis in a rectangular coordinate system, and Py represents the y-coordinate on the y-axis which is a vertical axis. In step S902, the line rendering control unit 801 requests the line type determination unit 804 to determine whether the line segment defined by the two points P1 and P2 is a vertical or horizontal line. The line type determination unit 804 determines whether P1x and P2x are equal. If P1x and P2x are equal, the process advances to step S903; if they are different, to step S906. In step S903, the line type determination unit 804 determines whether P1y is equal to or larger than P2y. If P1y is equal to or larger than P2y, the process advances to step S904; if P1y is smaller than P2y, to step S905. In step S904, the line rendering control unit 801 requests the rectangle rendering request unit 806 to render a rectangle. Upon receiving the request, the rectangle rendering request unit 806 sets, in the current graphics context, color information acquired from the screen information management unit 302, and requests the graphics library 211 to render a rectangle at a lateral width of 1 and a longitudinal width of P1y−P2y+1 based on the current graphics context. In step S905, the line rendering control unit 801 requests the rectangle rendering request unit 806 to render a rectangle. Upon receiving the request, the rectangle rendering request unit 806 sets, in the current graphics context, color information acquired from the screen information management unit 302, and requests the graphics library 211 to render a rectangle at a lateral width of 1 and a longitudinal width of P2y−P1y+1 based on the current graphics context. In step S906, the line type determination unit 804 determines whether P1y and P2y are equal. If P1y and P2y are equal, the process advances to step S907; if they are different, to step S910. If P1x is equal to or larger than P2x in step S907, the process advances to step S908; if P1x is smaller than P2x, to step S909. In step S908, the line rendering control unit 801 requests the rectangle rendering request unit 806 to render a rectangle. Upon receiving the request, the rectangle rendering request unit 806 sets, in the current graphics context, color information acquired from the screen information management unit 302, and requests the graphics library 211 to render a rectangle at a lateral width of P1x−P2x+1 and a longitudinal width of 1 based on the current graphics context. In step S909, the line rendering control unit 801 requests the rectangle rendering request unit 806 to render a rectangle. Upon receiving the request, the rectangle rendering request unit 806 sets, in the current graphics context, color information acquired from the screen information management unit 302, and requests the graphics library 211 to render a rectangle at a lateral width of P2x−P1x+1 and a longitudinal width of 1 based on the current graphics context. In step S910, the line rendering control unit 801 requests the straight line rendering request unit 805 to render a straight line. Upon receiving the request, the straight line rendering request unit 805 sets, in the current graphics context, color information acquired from the screen information management unit 302, and requests the graphics library 211 to render a straight line connecting P1 and P2 based on the current graphics context.

Upon receiving the rectangle rendering request, the graphics library 211 issues a rendering request via the window system 214 to a driver corresponding to the setting. In the embodiment, the graphics library 211, which has been requested to render a rectangle, requests rendering of the graphics driver 215. Hence, the GPU 130 executes rectangle rendering in FIG. 9, that is, rendering of a horizontal or vertical straight line. Only when the straight line is a vertical or horizontal line, rendering of a rectangle having a width of a predetermined value is performed, as in the embodiment.

This implements efficient rendering of a straight line parallel to or perpendicular to a raster line (that is, a straight line parallel to a side of the display unit of the operation panel or a pixel array). This is because the GPU 130 can quickly execute rectangle rendering. Vertical and horizontal lines form 90% or more of straight lines of the user interface of the image forming apparatus. Thus, increasing the speed of rendering these straight lines greatly contributes to shortening the rendering time per image display.

In the embodiment, the line width of a straight line to be rendered is 1. However, it is also possible to acquire not only the color but also the line width from a graphics context, and render a line by rendering (filling) a rectangle using the line width as the length of a short side and the length of the designated line as the length of a long side.

(Character Rendering Processing (S705))

FIG. 10 is a software block diagram showing details of the character rendering unit 307. A character rendering control unit 1001 accepts a content rendering request from the graphics rendering control unit 305, and causes a font data interpretation unit 1002 to interpret the content as font data. The character rendering control unit 1001 requests a character rendering request unit 1010 to render the font data. The font data interpretation unit 1002 reads the content, interprets it as font data, and stores the font data in a font data storage unit 1003. The interpretation of a content as font data means that, when the content is a character "A", "A" is recognized as a set (font data) of rasterized pixels in order to output "A" on the screen. The character rendering unit 307 requests the graphics library 211 to render the font data stored in the font data storage unit 1003. A point rendering request unit 1011 analyzes pixels forming the font data, and requests the graphics library 211 to render opaque pixels.

Figure 11:
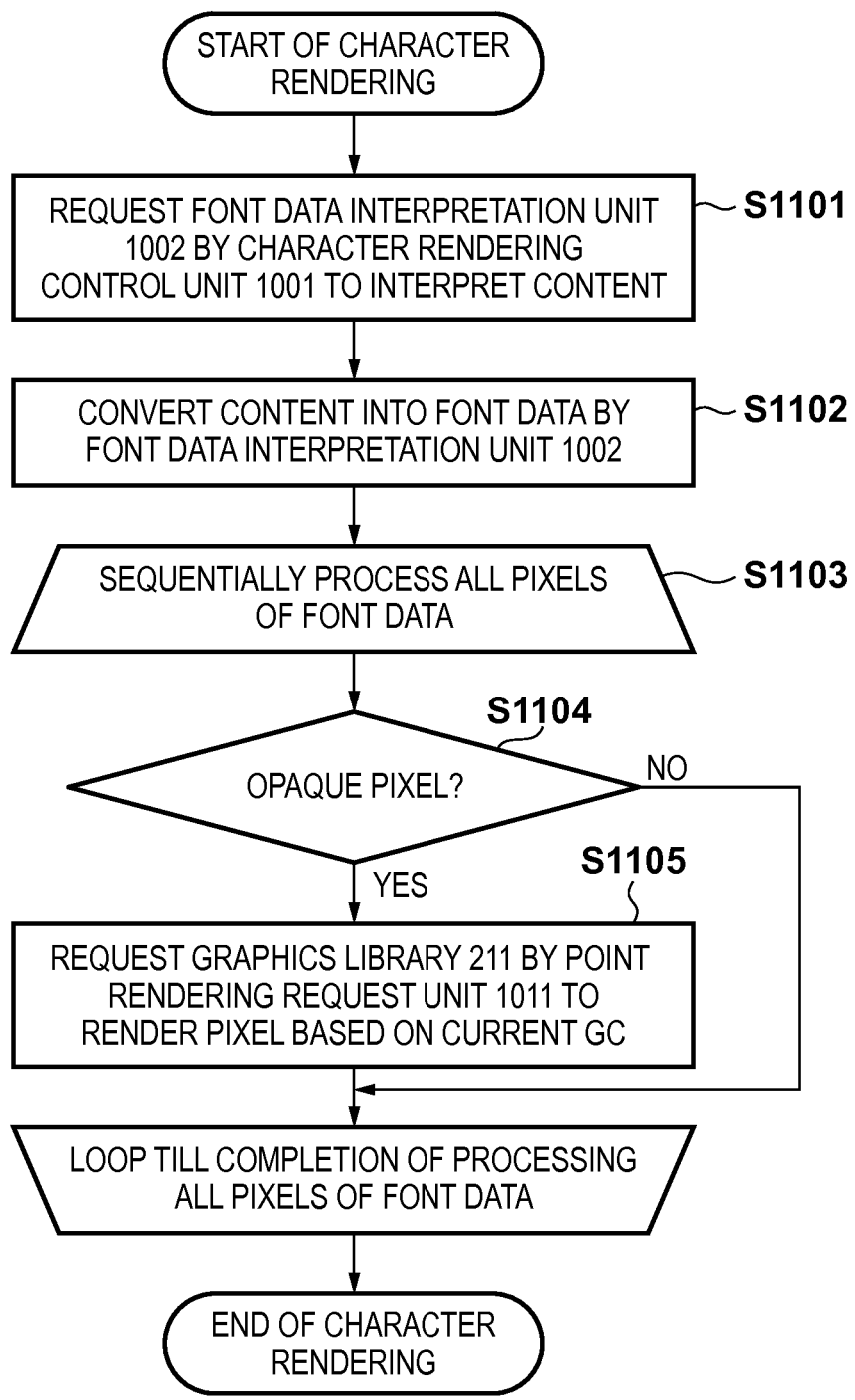
FIG. 11 is a flowchart showing character rendering processing by the virtual machine to which the embodiment is applied.

FIG. 11 is a flowchart showing details of the character rendering processing in step S706. In step S1101, the character rendering control unit 1001 requests the font data interpretation unit 1002 to interpret a content. In step S1102, the font data interpretation unit 1002 converts the content into font data. In step S1103, the character rendering control unit 1001 performs iterative control to perform processes in steps S1104 and S1105 for all the pixels of font data. In step S1104, the character rendering control unit 1001 determines whether the pixel is opaque. If the pixel is opaque, the process advances to step S1105; if NO, returns to step S1103 to shift the process to the next pixel. Opaque pixels form a character, and transparent pixels serve as the background of the character. In step S1105, the point rendering request unit 1011 requests the graphics library 211 to render the pixel based on the current graphics context. As a result, the character image is rendered in the image memory, and an image including the character is displayed on the display unit of the operation panel.

As described above, rendering is skipped for a transparent pixel. A graphic engine used to render a character need not cope with transparency, and a character can be rendered using the GPU 130 regardless of whether the graphics driver 215 and GPU 130 cope with transparency.

Operation Effects of First Embodiment

As described above, the virtual machine 250 loads, to the virtual machine resource management unit 253, bytecodes obtained by compiling an application, and the bytecode interpretation unit 251 sequentially interprets them. The graphics processing control unit 254 sends a rendering request to the graphics library 211 in accordance with the interpreted native command, implementing rendering processing on the operation unit 112. In the course of the rendering processing, the graphics context is switched in accordance with the transparency value of the screen, and the appropriate graphics library 211 is requested to render a content. A content having no transparency value is rendered using the transparency-incompatible graphics library 213. This can shorten the rendering time, compared to rendering by the transparency-compatible graphics library 212 which always considers the transparency value to perform rendering processing even if the content does not have a transparency value. This is because, if the GPU 130 does not cope with transparency processing or if the GPU 130 copes with transparency processing but the graphics driver 215 does not cope with it, transparency processing using the GPU 130 cannot be performed quickly. Furthermore, the benefit of the GPU 130 is not received unless the window system 214 utilizes the mechanism of issuing a rendering command corresponding to transparency processing to the graphics driver 215. The graphics library 211 assuming an operation on the window system 214 performs transparency processing by using the CPU 101. For this reason, the virtual machine 250 appropriately skips unnecessary transparency processing by using the transparency-compatible graphics library 212. This decreases the load on the CPU 101 and improves the performance of the image forming apparatus.

In the virtual machine 250, the line rendering unit 306 requests the graphics library 211 to render a straight line or rectangle in accordance with the positional relationship between two points forming a line. Rendering of a straight line requires rasterization based on the gradient of the straight line. However, the rasterization cannot always be performed using the GPU 130, as described above, and the graphics library 211 may execute calculation using the CPU. In this case, even if the straight line is a vertical or horizontal line, rasterization is highly likely to be performed similarly to a general straight line. To eliminate the possibility of this, the overhead of condition determination increases. Thus, the load of rasterization can be decreased by rendering a rectangle at a width of 1 only when the straight line is a vertical or horizontal line, as in the embodiment. As for rectangle rendering, the graphics library 211 can use the GPU 130 in many cases. In addition, vertical and horizontal lines form 90% or more of straight lines of the user interface of the image forming apparatus. Thus, increasing the speed of rendering these straight lines greatly improves the user friendliness.

Second Embodiment

The second embodiment will describe character rendering especially. The second embodiment is premised on that a GPU 130 and graphics driver 215 cope with transparency processing. In the first embodiment, the character rendering request unit 1010 renders a character on the operation unit 112 by using the point rendering request unit 1011. However, when the graphics library 211 can use the GPU 130, point rendering is processing of calling the GPU 130 for each pixel. As the number of opaque pixels included in a character increases, the amount of communication between the CPU 101 and the GPU 130 increases and the speed of response to the user decreases. An embodiment for suppressing the overhead in point rendering will be explained. Note that the same reference numerals of building components and the same steps in the drawings as those in the first embodiment denote the same functions and processes, and a description thereof will not be repeated.

Figure 12:
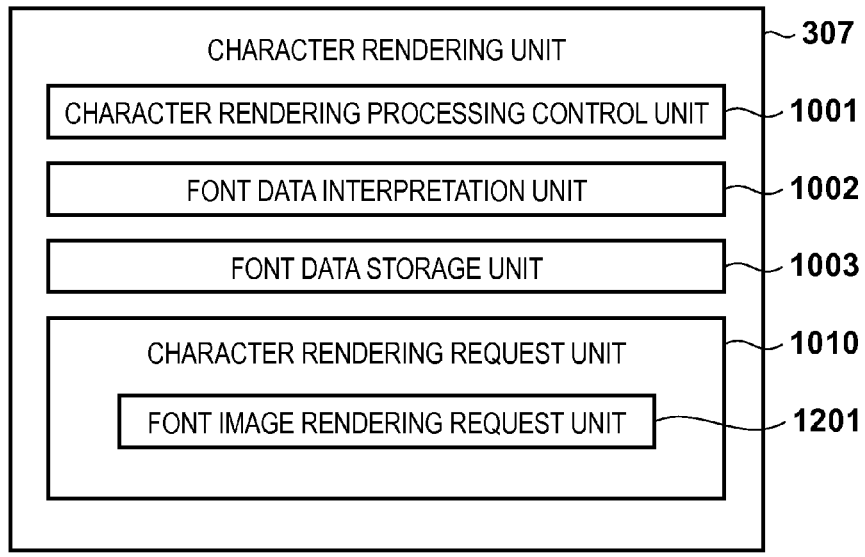
FIG. 12 is a software block diagram showing the character rendering function of a virtual machine to which an embodiment is applied.

FIG. 12 is a software block diagram showing details of a character rendering unit 307 according to the second embodiment. The difference from FIG. 10 is that a character rendering request unit 1010 includes not the point rendering request unit 1011 but a font image rendering request unit 1201. The font image rendering request unit 1201 converts font data in an image buffer, and requests a graphics library 211 to render a character as an image.

Figure 13:
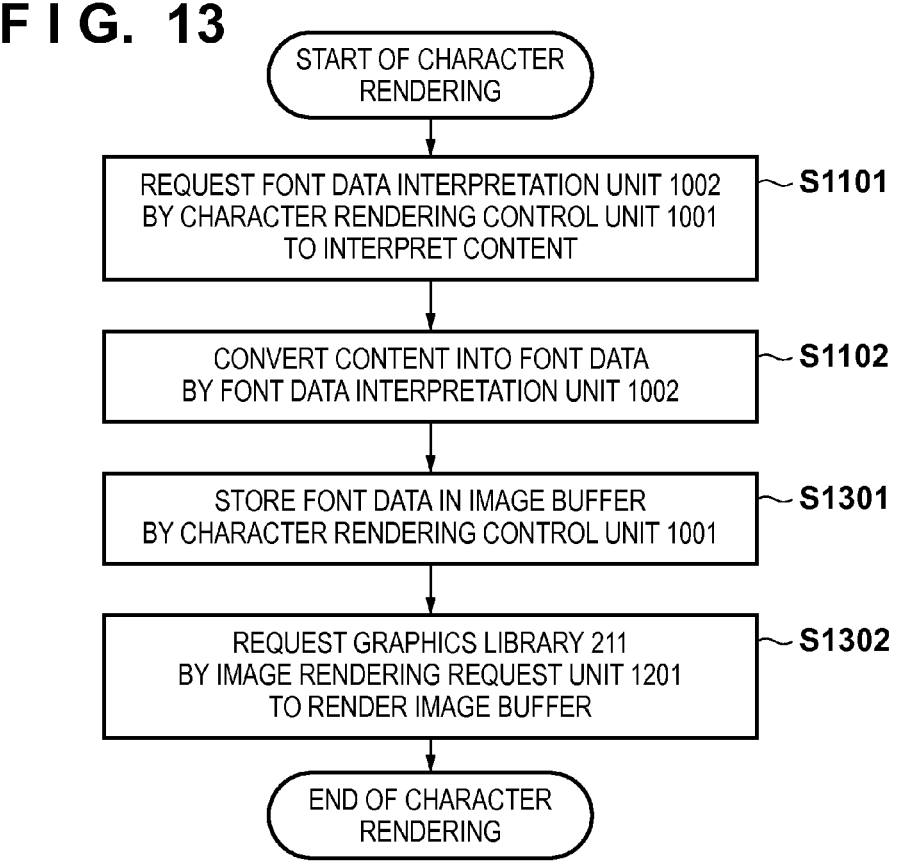
FIG. 13 is a flowchart showing character rendering processing by the virtual machine to which the embodiment is applied.

FIG. 13 is a flowchart showing details of the character rendering processing according to the second embodiment. In step S1301, a character rendering control unit 1001 requests the graphics library 211 to ensure an image buffer for storing font data based on a font size obtained from font data. The character rendering control unit 1001 stores the acquired image buffer in a native resource management unit 256. The character rendering control unit 1001 acquires color information from a screen information management unit 302, and saves, in the image buffer, data to which the opaque pixels of the font data and the acquired color are assigned. In step S1302, the font image rendering request unit 1201 requests the graphics library 211 to render the image buffer based on the current graphics context.

A virtual machine 250 according to the second embodiment uses the font image rendering request unit 1201 to render a character as an image. When a character is rendered as an image, the number of times by which the GPU 130 is used decreases, compared to a case in which a character is rendered by points, thereby reducing the overhead. Processing of storing font data in the image buffer by using the CPU 101 is performed more frequently. However, when font data includes many opaque pixels, the speed of character rendering processing increases thanks to the reduced overhead of the GPU 130. Particularly for the user interface of the image forming apparatus, one screen has about 200 characters on average, the number of opaque pixels exceeds 10,000, and rendering by the point rendering request unit 1011 calls the GPU 130 10,000 times or more. In contrast, rendering by the font image rendering request unit 1201 is suppressed to about 200 times. This contributes to increasing the user sensible speed.

Third Embodiment

The second embodiment implements high-speed character rendering processing by rendering all characters as images. However, even font data having a small number of opaque pixels, such as "," or "'", is rendered as an image. If the number of opaque pixels is small, the processing time of generation of an image buffer by the CPU 101 and image rendering using the GPU 130 may exceed the overhead of the GPU 130. An embodiment for suppressing the overhead in image rendering will be explained. Note that the same reference numerals of building components and the same steps in the drawings as those in the first and second embodiments denote the same functions and processes, and a description thereof will not be repeated.

FIG. 14 is a software block diagram showing details of a character rendering unit 307. The difference from FIGS. 10 and 12 is that a character rendering request unit 1010 includes both a point rendering request unit 1011 and font image rendering request unit 1201, and also includes a character rendering method determination unit 1401 and threshold storage unit 1402. The character rendering method determination unit 1401 compares the number of opaque pixels included in font data with a threshold obtained from the threshold storage unit 1402, and determines which of point rendering and image rendering is to be used to render a character. Note that the threshold storage unit 1402 stores parameters designated upon activation of a virtual machine 250, numerical values obtained from an external file, or appropriate numerical values corresponding to the image forming apparatus. For example, the number of pixels is decided experimentally or in consideration of the processing ability of a GPU 130 so that the processing time becomes equal between a case in which a character is rendered as an image and a case in which a character is processed for each pixel. The decided number of pixels is set as the threshold.

Figure 15:
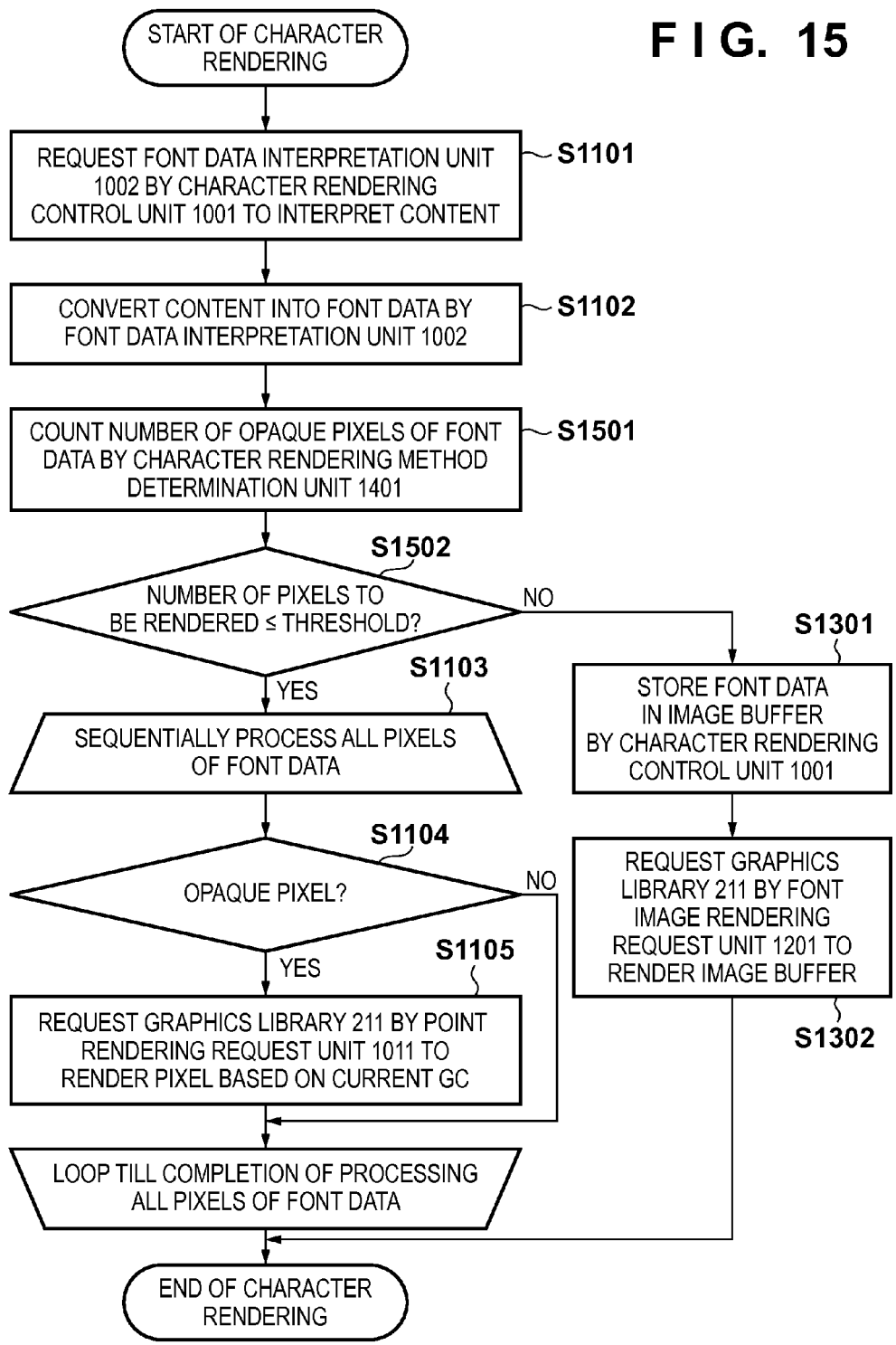
FIG. 15 is a flowchart showing character rendering processing by the virtual machine to which the embodiment is applied.

FIG. 15 is a flowchart showing details of the character rendering processing according to the third embodiment. In step S1501, the character rendering method determination unit 1401 counts the number of opaque pixels of font data. In step S1502, the character rendering method determination unit 1401 compares the number of opaque pixels with a threshold acquired from the threshold storage unit 1402. Note that the number of opaque pixels may be compared with the threshold while counting the number of opaque pixels. This is sometimes efficient when the threshold is small. If the number of opaque pixels is equal to or smaller than the threshold, the process shifts to step S1103 to perform point rendering; if NO, to step S1301 to perform image rendering.

In the virtual machine 250 according to the third embodiment, the character rendering method determination unit 1401 changes the character rendering method based on the threshold. Point rendering is performed when the processing time of rendering all characters as images is longer than that of rendering by points because the number of opaque pixels is small. As a result, the character rendering time is shortened.

Fourth Embodiment

In the third embodiment, the character rendering method is switched based on the threshold. In general, the virtual machine 250 supports a plurality of font sizes. Unless a threshold corresponding to a font size is given, the rendering method cannot be switched appropriately. This means that appropriate thresholds need to be calculated for all sizes when there are a plurality of types of font sizes. This increases the number of operation processes of performance tuning. A character rendering switching method in a virtual machine 250 which supports a plurality of font sizes will be explained. Note that the same reference numerals of building components and the same steps in the drawings as those in the first, second, and third embodiments denote the same functions and processes, and a description thereof will not be repeated.

Figure 16:
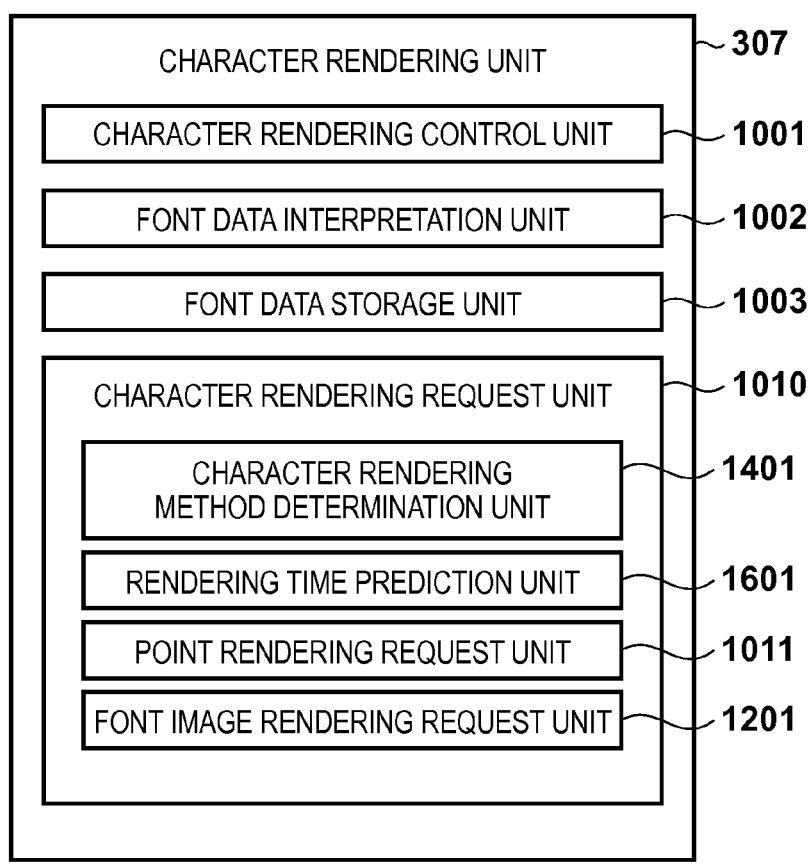
FIG. 16 is a software block diagram showing the character rendering function of a virtual machine to which an embodiment is applied.

FIG. 16 is a software block diagram showing details of a character rendering unit 307. The difference from FIG. 14 is that a character rendering request unit 1010 includes not the threshold storage unit 1402 but a rendering time prediction unit 1601. The rendering time prediction unit 1601 has a function of obtaining a processing time necessary for point rendering as a predicted value of the point rendering processing time from the processing time necessary to render one point and the number of opaque pixels. Further, the rendering time prediction unit 1601 has a function of obtaining, from the font size, a processing time necessary for image rendering as a predicted value of the font image rendering time.

Figure 17:
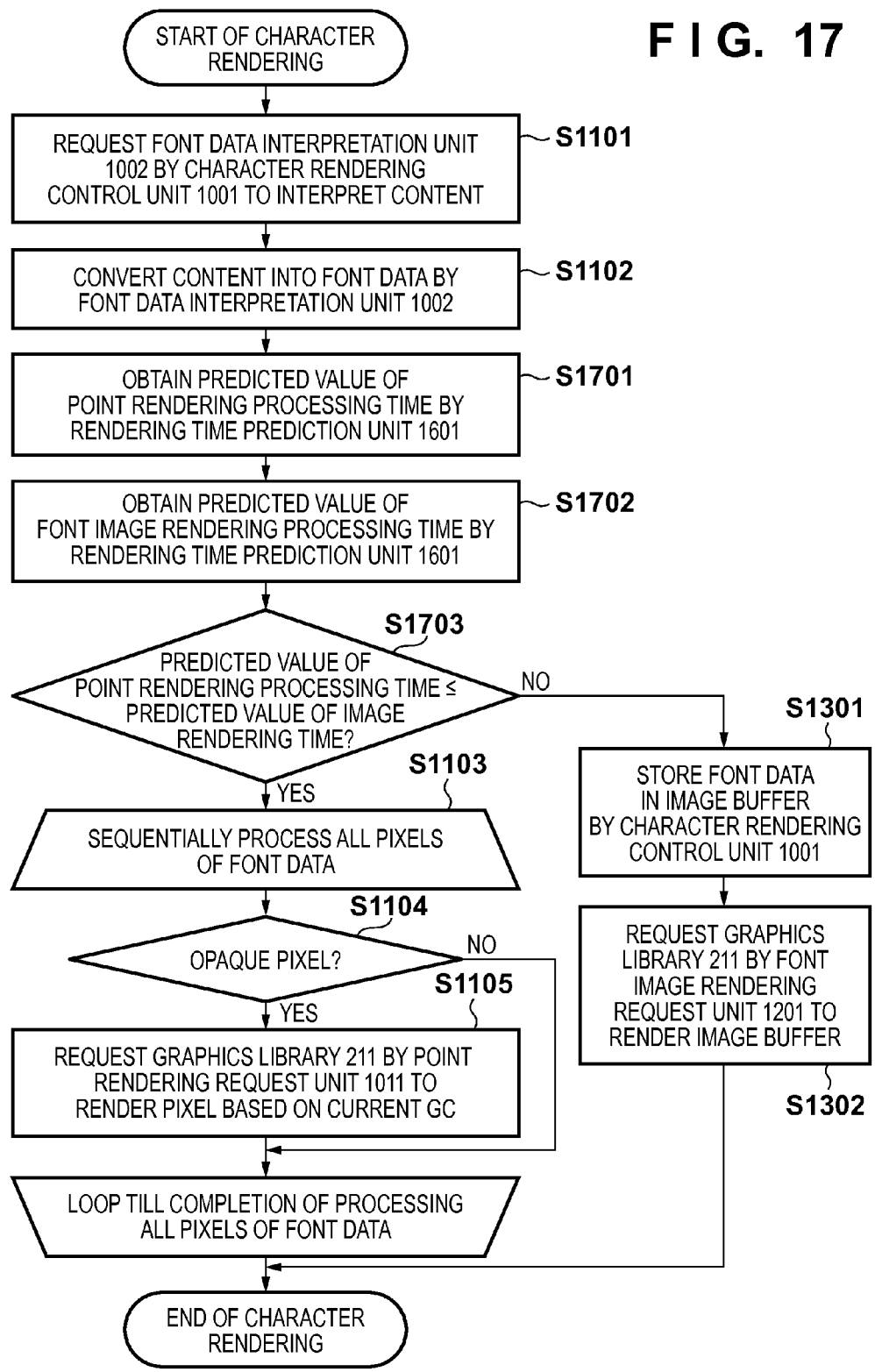
FIG. 17 is a flowchart showing character rendering processing by the virtual machine to which the embodiment is applied.

FIG. 17 is a flowchart showing details of the character rendering processing according to the fourth embodiment. In step S1701, the rendering time prediction unit 1601 obtains the number of opaque pixels from font data, and obtains the predicted value of the point rendering processing time from the number of opaque pixels. In step S1702, the rendering time prediction unit 1601 obtains the predicted value of the font image rendering processing time from the font size. If a character rendering method determination unit 1401 determines in step S1703 that the predicted value of the point rendering processing time is equal to or smaller than the predicted value of the font image rendering time, the process shifts to step S1103 to perform point rendering; if NO, to step S1301 to perform image rendering.

In the virtual machine 250 according to the fourth embodiment, the rendering time prediction unit 1601 obtains the predicted value of the point rendering processing time and the predicted value of the font image rendering time from the font size and the number of opaque pixels. Based on these predicted values, the character rendering method determination unit 1401 changes the character rendering method. An appropriate rendering method can be selected without obtaining a threshold for each font size as long as calculation equations to predict a processing time necessary to render one point and predict, from an image size, a processing time necessary to render an image are obtained in advance. Therefore, the number of operation processes of performance tuning can be decreased to shorten the character rendering time.

[Modification]

Prediction of a necessary time as in the fourth embodiment generates the overhead of the prediction processing itself. Considering this, the following arrangement can also be employed. For example, the processes in steps S1101 to S1703 of FIG. 17 are performed in advance to decide which of pixel-unit processing and image processing is to be performed for each character code and each size. The decision result is saved in accordance with the character code and size. In rendering, the process advances to step S1703 after steps S1101 and S1102. The process branches to step S1103 or S1301 based on the saved decision result used as the determination criterion on step S1703.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-167648, filed Jul. 27, 2012, which is hereby incorporated by reference herein in its entirety.

What is claimed is:

1. An image forming apparatus including a display unit, comprising:
a graphics driver configured to use a graphics processor which renders an image to be displayed by the display unit;
a graphics library configured to issue a rendering request to the graphics driver in accordance with a processing request via an API; and
a virtual machine unit configured to execute a program described in a predetermined programming language, the virtual machine unit performing processing by issuing a processing request to the graphics library via the API in accordance with the program to be executed,
wherein when performing rendering by executing the program, the virtual machine unit determines whether a color of image data in a frame buffer includes a transparency value, when the color includes a transparency value, selects a transparency processing-compatible graphics library as the graphics library and issues a rendering processing request to the graphics library, and when the color does not include a transparency value, selects a transparency processing-incompatible graphics library as the graphics library and issues a rendering processing request to the graphics library.

2. The apparatus according to claim 1, wherein the transparency processing-compatible graphics library issues a rendering request accompanying transparency processing to the graphics driver, and the transparency processing-incompatible graphics library issues a rendering request accompanying no transparency processing to the graphics driver.

3. The apparatus according to claim 1, further comprising a frame buffer driver configured to render an image to be displayed by the display unit without using the graphics processor,
wherein the graphics library issues a rendering request to the frame buffer driver instead of the graphics driver for rendering processing not coped with by the graphics processor.

4. The apparatus according to claim 1, wherein when rendering a straight line parallel to or perpendicular to a raster line by executing the program, the virtual machine unit issues a rendering processing request to the graphics library to fill a rectangular region having a width of the straight line as a length of a short side and a length of the straight line as a length of a long side.

5. The apparatus according to claim 4, wherein the width of the straight line has a predetermined value or a value of a line width included in a graphics context generated by the virtual machine unit.

6. The apparatus according to claim 1, wherein when rendering a character by executing the program, the virtual machine unit generates a character image corresponding to the character, and issues a processing request to the graphics library to render, for each pixel, pixels forming the character in the character image.

7. The apparatus according to claim 6, wherein when rendering a character, the virtual machine unit generates a character image corresponding to the character, and issues a processing request to the graphics library to render the character image without issuing a processing request for rendering for each pixel.

8. The apparatus according to claim 6, wherein when rendering a character, the virtual machine unit generates a character image corresponding to the character, compares the number of pixels forming the character in the character image with a threshold, when the number of pixels forming the character is not larger than the threshold, issues a processing request for rendering for each pixel to the graphics library, and when the number of pixels forming the character exceeds the threshold, issues a processing request to the graphics library to render the character image without issuing a processing request for rendering for each pixel.

9. The apparatus according to claim 6, wherein when rendering a character, the virtual machine unit generates a character image corresponding to the character, obtains and compares a predicted value of a processing time in a case in which a processing request for rendering for each pixel is issued to the graphics library, and a predicted value of a processing time in a case in which a processing request to render the character image is issued to the graphics library without issuing a processing request for rendering for each pixel, and issues the processing request having a smaller predicted value to the graphics library.

10. An image forming apparatus including a display unit, comprising:
- a graphics driver configured to use a graphics processor which renders an image to be displayed by the display unit;
- a graphics library configured to issue a rendering request to the graphics driver in accordance with a processing request via an API; and
- a virtual machine unit configured to execute a program described in a predetermined programming language, the virtual machine unit performing processing by issuing a processing request to the graphics library via the API in accordance with the program to be executed,
- wherein when rendering a straight line parallel to or perpendicular to a raster line by executing the program, the virtual machine unit issues a rendering processing request to the graphics library to fill a rectangular region having a width of the straight line as a length of a short side and a length of the straight line as a length of a long side.

11. The apparatus according to claim 10, wherein the width of the straight line has a predetermined value or a value of a line width included in a graphics context generated by the virtual machine unit.

12. An image forming apparatus including a display unit, comprising:
- a graphics driver configured to use a graphics processor which renders an image to be displayed by the display unit;
- a graphics library configured to issue a rendering request to the graphics driver in accordance with a processing request via an API; and
- a virtual machine unit configured to execute a program described in a predetermined programming language, the virtual machine unit performing processing by issuing a processing request to the graphics library via the API in accordance with the program to be executed,
- wherein when rendering a character by executing the program, the virtual machine unit generates a character image corresponding to the character, and issues a processing request to the graphics library to render, for each pixel, pixels forming the character in the character image.

13. The apparatus according to claim 12, wherein when rendering a character, the virtual machine unit generates a character image corresponding to the character, and issues a processing request to the graphics library to render the character image without issuing a processing request for rendering for each pixel.

14. The apparatus according to claim 12, wherein when rendering a character, the virtual machine unit generates a character image corresponding to the character, compares the number of pixels forming the character in the character image with a threshold, when the number of pixels forming the character is not larger than the threshold, issues a processing request for rendering for each pixel to the graphics library, and when the number of pixels forming the character exceeds the threshold, issues a processing request to the graphics library to render the character image without issuing a processing request for rendering for each pixel.

15. The apparatus according to claim 12, wherein when rendering a character, the virtual machine unit generates a character image corresponding to the character, obtains and compares a predicted value of a processing time in a case in which a processing request for rendering for each pixel is issued to the graphics library, and a predicted value of a processing time in a case in which a processing request to render the character image is issued to the graphics library without issuing a processing request for rendering for each pixel, and issues the processing request having a smaller predicted value to the graphics library.

* * * * *